(12) United States Patent
DeLeeuw et al.

(10) Patent No.: US 9,854,436 B2
(45) Date of Patent: Dec. 26, 2017

(54) LOCATION AND PROXIMITY BEACON TECHNOLOGY TO ENHANCE PRIVACY AND SECURITY

(71) Applicant: Intel Corporation, Santa Clara, CA (US)

(72) Inventors: William C. DeLeeuw, Beaverton, OR (US); Bradford H. Needham, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 673 days.

(21) Appl. No.: 14/495,936

(22) Filed: Sep. 25, 2014

(65) Prior Publication Data

US 2017/0195874 A1    Jul. 6, 2017

(51) Int. Cl.

| H04W 4/02 | (2009.01) |
|---|---|
| H04W 12/02 | (2009.01) |
| H04W 12/04 | (2009.01) |
| H04L 9/32 | (2006.01) |
| G06F 7/58 | (2006.01) |

(52) U.S. Cl.
CPC ........... *H04W 12/02* (2013.01); *H04L 9/3247* (2013.01); *H04W 4/02* (2013.01); *H04W 12/04* (2013.01); *G06F 7/582* (2013.01)

(58) Field of Classification Search
CPC ......... G06F 7/58; G06F 7/582; H04L 9/0662; H04L 9/3247; H04W 12/06; H04W 4/02; H04W 12/02
See application file for complete search history.

(56) References Cited

U.S. PATENT DOCUMENTS

| 6,687,375 B1 | 2/2004 | Matyas, Jr. et al. |
| 6,795,808 B1 | 9/2004 | Strubbe et al. |
| 8,027,842 B2 | 9/2011 | Creamer et al. |

(Continued)

FOREIGN PATENT DOCUMENTS

| CN | 103477672 A | 12/2013 |
| KR | 20090024804 A | 3/2009 |

(Continued)

OTHER PUBLICATIONS

International Search Report for International Application No. PCT/US2015/033822, dated Aug. 31, 2015, 3 pages.

(Continued)

*Primary Examiner* — Charles Appiah
*Assistant Examiner* — Margaret G Mastrodonato
(74) *Attorney, Agent, or Firm* — Jordan IP Law, LLC

(57) ABSTRACT

Systems and methods may provide for obtaining a seed value from a location on a beacon device, using the seed value to initiate generation of a pseudo random number (PRN) tree having time-dependent branches, and sending a beacon signal based on the PRN tree and a timing schedule that corresponds to the time-dependent branches. Additionally, a PRN may be received, via an out-of-band link, at an observation device, wherein the PRN is associated with a particular time period. In one example, the PRN may be used by the observation device to generate a subset of a PRN number tree that corresponds to the particular time period. The observation device may also conduct a proximity determination of whether a detected beacon signal corresponds to one or more time-dependent branches of the subset of the PRN tree.

20 Claims, 5 Drawing Sheets

(56) References Cited

U.S. PATENT DOCUMENTS

| | | | |
|---|---|---|---|
| 8,560,587 | B2 | 10/2013 | Schneider et al. |
| 2006/0116990 | A1 | 6/2006 | Margolus et al. |
| 2008/0022134 | A1 | 1/2008 | Wang |
| 2008/0269958 | A1 | 10/2008 | Filev et al. |
| 2009/0323972 | A1 | 12/2009 | Kohno et al. |
| 2010/0199098 | A1 | 8/2010 | King |
| 2011/0131459 | A1 | 6/2011 | Tu et al. |
| 2011/0179011 | A1 | 7/2011 | Cardno et al. |
| 2011/0283190 | A1 | 11/2011 | Poltorak |
| 2012/0026916 | A1 | 2/2012 | Ptasinski et al. |
| 2012/0072217 | A1 | 3/2012 | Bangalore et al. |
| 2012/0093312 | A1 | 4/2012 | Gammel et al. |
| 2012/0179735 | A1 | 7/2012 | Ferguson et al. |
| 2013/0304781 | A1 | 11/2013 | Dey |
| 2014/0215594 | A1 | 7/2014 | Lambert |
| 2016/0012252 | A1 | 1/2016 | DeLeeuw et al. |

FOREIGN PATENT DOCUMENTS

| | | |
|---|---|---|
| KR | 101182450 A | 10/2012 |
| WO | 2015099661 A1 | 7/2015 |
| WO | 2015187724 A2 | 12/2015 |

OTHER PUBLICATIONS

Written Opinion of the International Search Report for International Application No. PCT/US2015/033822, dated Aug. 31, 2015, 7 pages.

International Search Report and Written Opinion for PCT Patent Application No. PCT/US2015/047464, dated Mar. 18, 2016, 10 pages.

3GPP, "Technical Specification Group Core Network and Terminals: Numbering, addressing and identification (Release 12)", 3GPP TS 23.003 V12.3.0., Jun. 20, 2014, 90 pages.

Hamburg, Michael, "Understanding Intel's Ivy Bridge Random Number Generator", Cryptography Research, retrieved from <electronicdesign.com/learningresources/understanding-intels-ivy-bridge-random-number-generator>, Dec. 11, 2012, 4 pages.

"Pseudorandom Number Generator", Wikipedia, retrieved from <en.wikipedia.org/wiki/Pseudo_random_number_generator>, Feb. 16, 2016, 6 pages.

"Distributed Hash Table", Wikipedia, retrieved from <en.wikipedia.org/wiki/Distributed_hash_table>, Apr. 3, 2016, 8 pages.

Non-Final Office Action for U.S. Appl. No. 14/369,268, dated Dec. 9, 2015, 15 pages.

Final Office Action for U.S. Appl. No. 14/369,268, dated Mar. 31, 2016, 11 pages.

International Search Report and Written Opinion for PCT Patent Application No. PCT/US2013/077519, dated Sep. 24, 2014, 10 pages.

Notice of Allowance for U.S. Appl. No. 14/294,345, dated Feb. 8, 2016, 31 pages.

Notice of Allowance for U.S. Appl. No. 14/294,345, dated May 24, 2016, 15 pages.

DeLeeuw, William C., "Improving Natural Language Interactions Using Emotional Modulation", PCT Patent Application No. PCT/US2013/061678, filed on Sep. 25, 2013, 31 pages.

International Search Report and Written Opinion received for PCT Patent Application No. PCT/US2013/061678, dated Jun. 24, 2014, 12 pages.

Estimote, Inc., "API Documentation", Estimate for Developers, retrieved on Aug. 18, 2014, 6 pages. web page available at: http://estimote.com/api/index.html.

Gimbal, Inc. "Gimbal™ SDK for iOS Documentation", V 1.15, May 2014, 31 pages.

DeLeeuw et al., "Techniques and Architecture for Anonymizing User Data", PCT Patent Application No. PCT/US2013/077519, filed on Dec. 23, 2013, 48 pages.

DeLeeuw et al., "Temporal and Spatial Bounding of Personal Information", U.S. Appl. No. 14/294,345, filed Jun. 3, 2014, 64 pages.

LOCATION AND PROXIMITY BEACON TECHNOLOGY TO ENHANCE PRIVACY AND SECURITY

TECHNICAL FIELD

Embodiments generally relate to beaconing systems. More particularly, embodiments relate to location and proximity beacon technology that enhances privacy and security.

BACKGROUND

Indoor beaconing systems may use Bluetooth (e.g., Institute of Electrical and Electronics Engineers/IEEE 802.15.1-2005, Wireless Personal Area Networks) technology to wirelessly transmit a unique identifier or personal name/identifier that is detectable by compatible devices in the nearby area. Thus, if the transmitter of the beaconing system is fixed, nearby devices may determine and/or prove their position based on the detected transmission. Such a solution may be vulnerable, however, to other devices "spoofing" the wireless transmission and potentially enabling the receiving devices to misrepresent their true location. Moreover, the use of such a solution may be inappropriate in other situations when the beacon transmitter is mobile (e.g., worn by a person) due to privacy concerns (e.g., individuals may be reluctant to broadcast their position in certain settings).

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
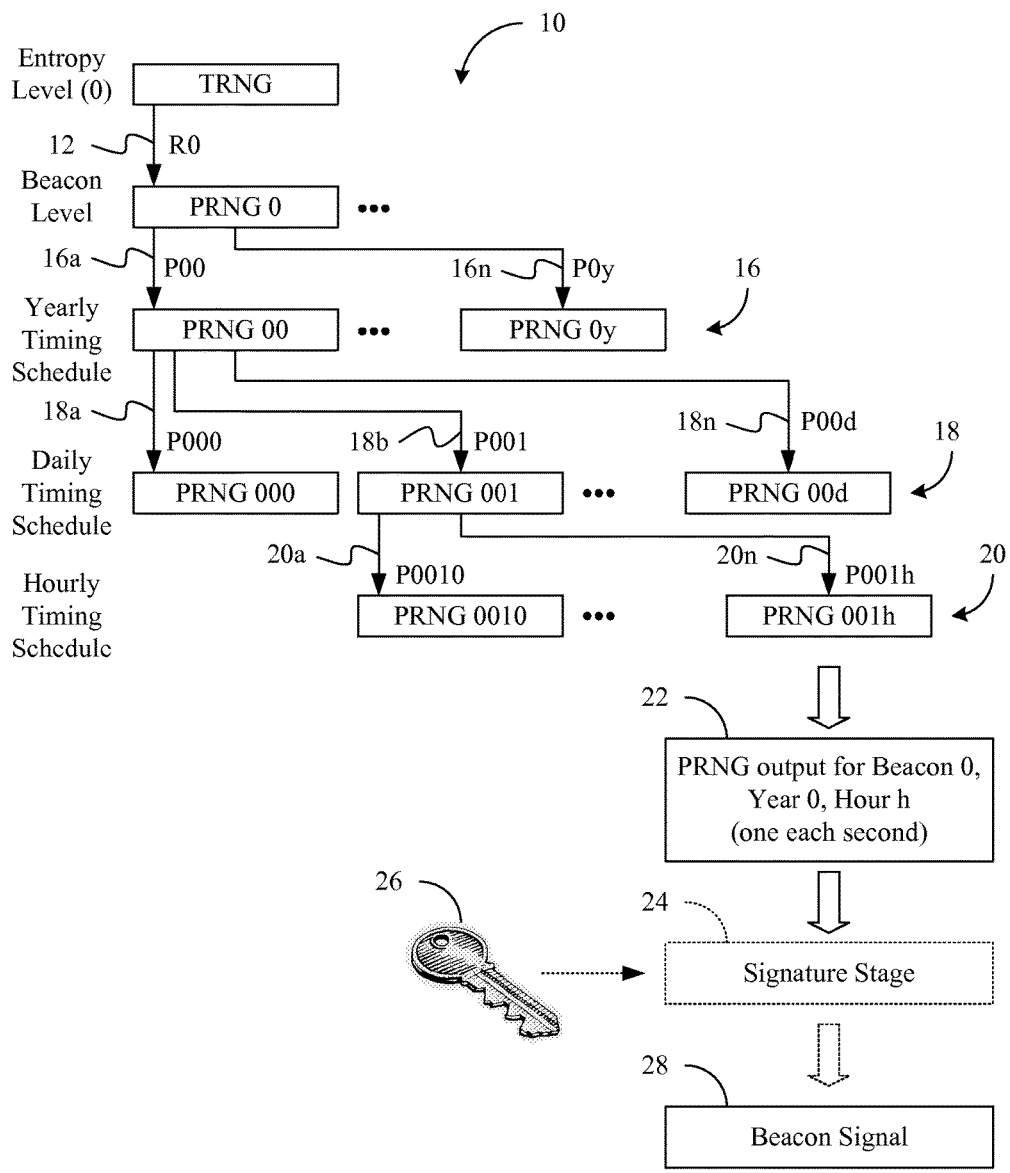
FIG. 1 is a block diagram of an example of a pseudo random number (PRN) tree according to an embodiment.

Turning now to FIG. 1, a pseudo random number (PRN) tree 10 is shown in which the PRN tree 10 has time-dependent branches that may be used to grant time-bounded access to a beacon signal. As will be discussed in greater detail, configuring the PRN tree 10 to enable time-bounded access to the beacon signal may provide substantial advantages with regard to security as well as privacy. Moreover, the beacon signal may appear to be random to non-trusted observers. In the illustrated example, an entropy level root seed value 12 ("R0") is generated by a true random number generator (TRNG), wherein the root seed value 12 may be statistically unique and associated with a particular beacon device (e.g., beacon 0). Thus, other root seed values (not shown) may be generated for other beacon devices. The root seed value 12 may be stored to a location (e.g., a secure location) on the beacon device, wherein the secure location may include, for example, memory and/or registers that are unexposed to and/or inaccessible by components not having entropy level access privileges to the beacon device in question. Alternatively, a PRN generator (PRNG) may use a secret value (e.g., known only to the manufacturer of the beacon device) to generate the root seed value 12.

The beacon device may use a beacon level pseudo random number generator (PRNG 0) and the root seed value 12 to generate a sequence of year-dependent branches 16 (16a-16n) containing PRNs that define a yearly timing schedule for the signal emitted by the beacon device. For example, a first year-dependent branch 16a ("P00") may represent the PRN for a first year (e.g., 2014) during which the beacon device emits a signal. Similarly, an $n^{th}$ year-dependent branch 16n ("P0y") may represent the PRN for an $n^{th}$ year (e.g., 2034) during which the beacon device emits a signal. In one example, an Advance Encryption Standard (AES) Counter (CTR) mode is used to generate PRNs.

Each year-dependent branch 16 of the tree 10 may in turn be used in conjunction with one or more yearly level PRNGs (e.g., PRNG 00 to PRNG 0y) to generate a sequence of day-dependent branches 18 (18a-18n) containing PRNs that define a daily timing schedule for the signal emitted by the beacon device. For example, a first day-dependent branch 18a ("P000") may represent the PRN for a first day (e.g., January 1) of the first year during which the beacon device emits a signal. Similarly, a second day-dependent branch 18b ("P001") may represent the PRN for a second day (e.g., January 2) of the first year during which the beacon device emits a signal. Additionally, an $n^{th}$ day-dependent branch 18n ("P00d") may represent the PRN for an $n^{th}$ day (e.g., December 31) of the first year during which the beacon device emits a signal.

Each day-dependent branch 18 of the tree may also be used in conjunction with one or more daily level PRNGs (e.g., PRNG 0010 to PRNG 001h) to generate a sequence of hour-dependent branches 20 (20a-20n) containing PRNs that define an hourly timing schedule for the signal emitted by the beacon device. For example, a first hour-dependent branch 20a ("P0010") may represent the PRN for a first hour (e.g., 12:00 AM to 1:00 AM) of the second day of the first year during which the beacon device emits a signal, whereas an $n^{th}$ hour-dependent branch 20n ("P001h") may represent the PRN for an $n^{th}$ hour (e.g., 11:00 PM to 12:00 AM) of the second day of the first year during which the beacon device emits a signal. The illustrated tree 10 may be further expanded for minutes, seconds, fractions of seconds, and so forth. The time periods provided herein are to facilitate discussion only and may vary depending upon the circumstances.

The resulting output 22 (e.g., leaves) of the time-dependent branches may be wirelessly transmitted as a beacon signal (e.g., one branch value each second) for observation by nearby devices. In one example, the output 22 is applied to a signature stage 24 that determines signature values for the branches of the PRN tree 10 based on a private key 26. In such a case, a secure beacon signal 28 may contain the signatures. Such an approach may prevent spoofing of the secure beacon signal 28 and further enhance privacy.

Figure 2:
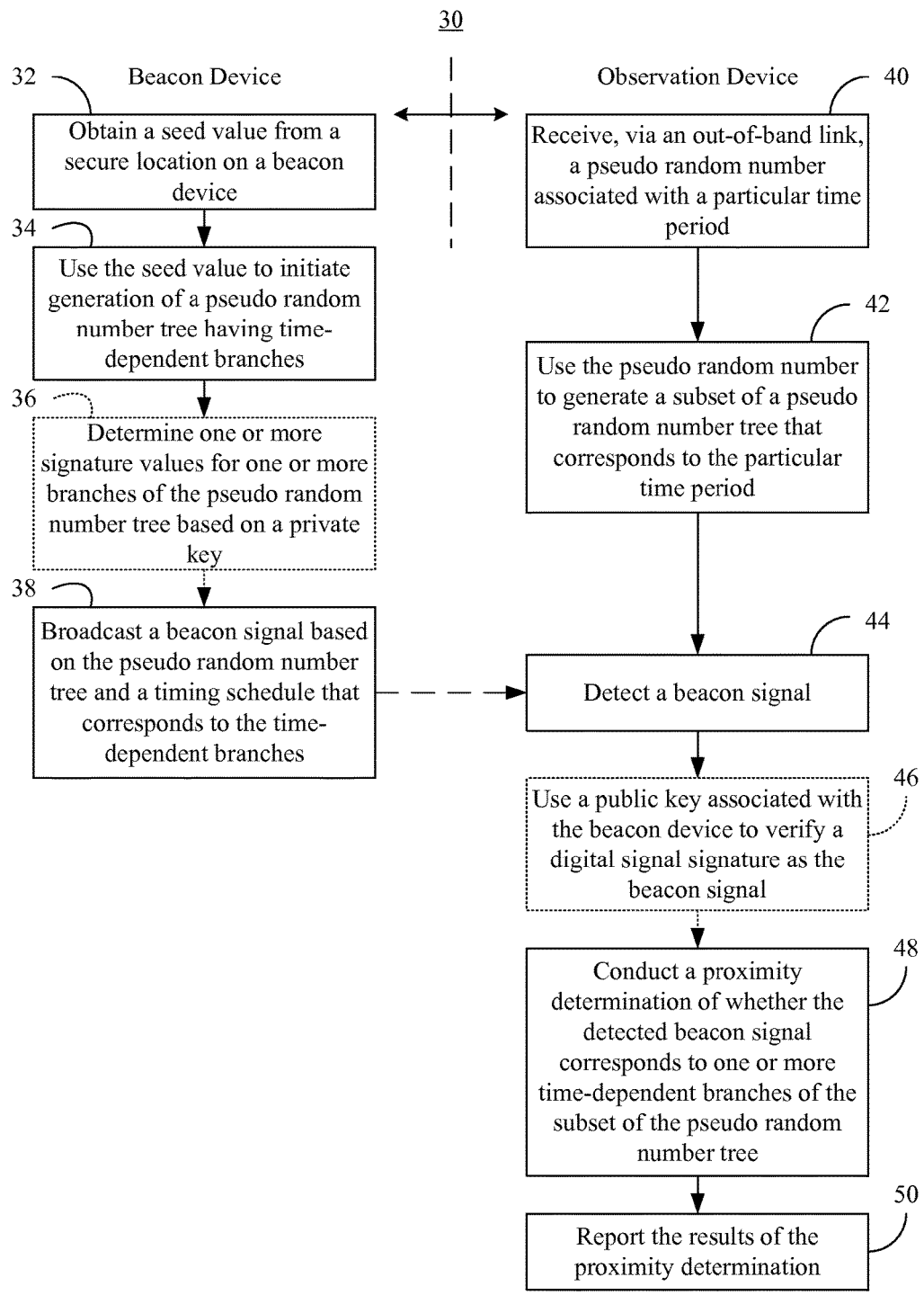
FIG. 2 is a flowchart of an example of a method of operating a beaconing system according to an embodiment.

Turning now to FIG. 2, a method 30 of operating a beaconing system is shown. The method 30 may be implemented as a module or related component in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 30 may be written in any combination of one or more programming languages, including an object oriented programming language such as Java, Smalltalk, C++, ACPI source language (ASL) or the like and conventional procedural programming languages, such as the "C" programming language or similar programming languages.

Illustrated beacon block 32 provides for obtaining a seed value such as, for example, the root seed value 12 (FIG. 1), from a secure location on a beacon device. As already noted, the secure location may include, for example, memory and/or registers that are unexposed to and/or inaccessible by components not having entropy level access privileges to the beacon device in question. The seed value may be used at beacon block 34 to initiate generation of a PRN tree such as, for example, the PRN tree 10 (FIG. 1), having time-dependent branches. One or more of the time-dependent branches of the PRN tree may be associated with a particular year, a particular day, a particular hour, a particular minute, a particular second, a particular fraction of a second, and so forth.

In one example, an optional beacon block 36 determines one or more signature values for one or more branches of the PRN tree based on a private key, which may also be obtained from a secure location on the beacon device. Block 36 might involve, for example, deriving (e.g., by hashing) the private key from the seed value so that the beacon device may be provisioned only with the seed value at the time of manufacture and/or update of the beacon device. Illustrated beacon block 38 sends (e.g., broadcasts) a beacon signal based on the PRN tree and a timing schedule that corresponds to the time-dependent branches. If the beacon block 36 is implemented, beacon block 38 may include broadcasting the signature values. Otherwise, beacon block 38 may include broadcasting the leaves (e.g., output of the lowest level branches) of the PRN tree.

Additionally, an observation block 40 may provide for receiving, via an out-of-band link, a PRN associated with a particular period of time (as well as an indication of the particular period of time). Block 40 may also include receiving a public key and/or digital certificate associated with the beacon device. The out-of-band link may include any communications link (e.g., email, text message, instant message, voice message) other than the link used by the beacon device to send the beacon signal. The particular time period may be, for example, a range of minutes, hours, days, months, years, etc., subscribed to or otherwise obtained on the part of a user of the observation device. For example, if the beacon device is fixed (e.g., located at a stationary vending machine, store, mall, and so forth) and the observation device is mobile (e.g., notebook computer, tablet computer, convertible tablet, mobile Internet device/MID, smart phone, wearable computer, media player, and so forth), the particular time period might correspond to a range of days during which a sales promotion is held at the fixed location. If, on the other hand, the beacon device is mobile (e.g., carried and/or worn by an individual) and the observation device is fixed (e.g., located at a stationary vending machine, store, mall, and so forth) or both devices are mobile, the particular time period may correspond to a range of hours during which the individual carrying the beacon device has consented to permitting the observation device to monitor the beacon signal.

Illustrated observation block 42 uses the PRN to generate a subset of the PRN tree that corresponds to the particular time period. For example, if the observation device has been authorized to monitor the beacon signal from 5:00 PM to 7:00 PM on Feb. 23, 2015, then the observation device may only be given the PRN for the year (2015), day (February 23) and hours (5:00 PM and 6:00 PM) of that branch of the PRN tree. As a result, the observation device may only be able to re-create the PRNs for the minutes, seconds, etc., to which the observation device has been subscribed.

A beacon signal may be detected at observation block 44, wherein a public key associated with the beacon device may optionally be used at observation block 46 to verify a digital signature as the beacon signal. The public key may be obtained from, for example, a digital certificate provided by an appropriate certifying authority. Illustrated observation block 48 provides for conducting a proximity determination of whether the detected beacon signal corresponds to one or more time-dependent branches of the subset of the PRN tree. Of particular note is that observation block 48 may be conducted entirely by the observation device and without accessing a remote server. Such an approach may substantially obviate privacy concerns associated with the sharing of beacon signal information.

Observation block 50 may report the results of the proximity determination (e.g., in order to determine indoor location, provide location attestation, conduct personal tracking, etc.). For example, block 50 may include reporting that a mobile source of the beacon signal traveled within proximity of the observation device during the particular time period if the proximity determination indicates that the beacon signal corresponds to one or more time-dependent branches of the subset of the PRN tree. If, on the other hand, the proximity determination does not indicate that the beacon signal corresponds to one or more time-dependent branches of the subset of the PRN tree, block 50 may involve reporting that the mobile source of the beacon did not travel within proximity of the observation device during the particular time period. Moreover, if the observation device is a mobile device, observation block 50 may involve reporting whether the mobile observation device traveled within proximity of the source of the beacon signal during the particular time period. The illustrated method may therefore provide enhanced security and privacy in a wide variety of settings such as, for example, advertising, promotions, criminal tracking, and so forth.

The ordering of the illustrated blocks may also vary. For example, the observation device might detect and record all nearby beacon signals, and then later receive one or more PRNs and corresponding public keys from individuals interested in proving that they were nearby at particular time periods. Upon receiving the PRNs and corresponding public keys, the observation blocks 46, 48 and 50 may be conducted for the appropriate time periods.

Figure 3:
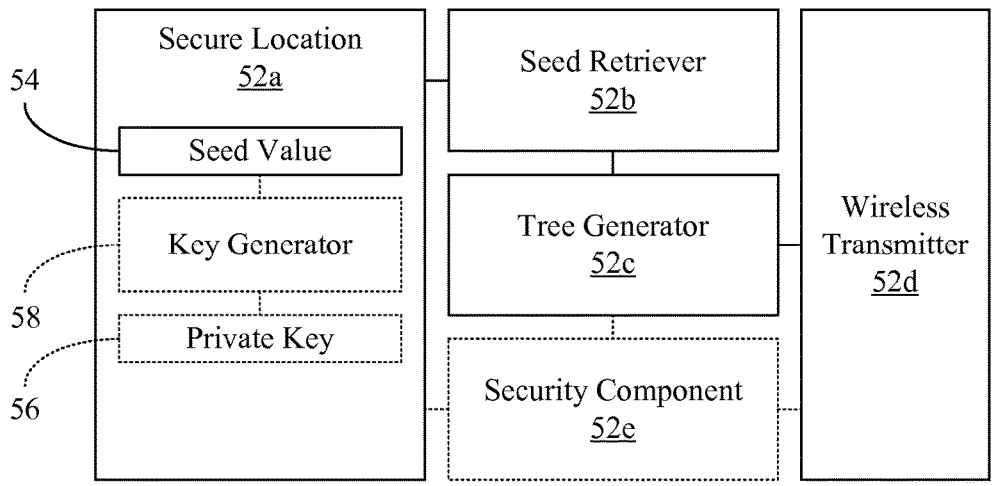
FIG. 3 is a block diagram of an example of a beacon device according to an embodiment.

Turning now to FIG. 3, a beacon device 52 (52a-52e) is shown. The beacon device 52 may generally implement one or more of the beacon blocks of the method 30 (FIG. 2), already discussed. More particularly, the illustrated beacon device 52 includes a secure location 52a (e.g., memory, register(s), etc., that are unexposed to and/or inaccessible by components not having entropy level access privileges) having a seed value 54 (e.g., true random number). The beacon device 52 may also include a seed retriever 52b coupled to the secure location 52a, wherein the seed retriever 52b is configured to obtain the seed value 54 from the secure location. Additionally, a tree generator 52c coupled to the seed retriever 52b may use the seed value 54 to generate at least a portion of a PRN tree (e.g., depending on memory space and/or power limitations) having time-dependent branches. Although the tree generator 52c might only generate a portion of the PRN tree at a given moment in time due to space and/or power limitations, the illustrated tree generator 52c does not have the same time bounded limitations placed on observing devices with regard to tree generation. In one example, the PRN tree is similar to the PRN tree 10 (FIG. 1), already discussed, and the tree generator 52c includes the PRNGs that generate the branches of the tree. Thus, one or more of the time-dependent branches of the PRN tree may be associated with a particular year, day, hour, second, fraction of a second, and so forth.

The illustrated beacon device 52 also includes a transmitter 52d (e.g., wireless and/or wired transmitter) coupled to the tree generator 52c, wherein the transmitter 52d is configured to send a beacon signal based on the PRN tree and a timing schedule that corresponds to the time-dependent branches. In one example, the transmitter 52d sends one or more branches of the PRN tree. In another example, the beacon device 52 also includes a security component 52e to determine one or more signature values for one or more branches of the PRN tree based on a private key 56, wherein the transmitter sends the one or more signature values. In such a case, the secure location 52a may further include the private key 56. Additionally, a key generator 58 may derive (e.g., via hashing) the private key 56 from the seed value 54.

Figure 4:
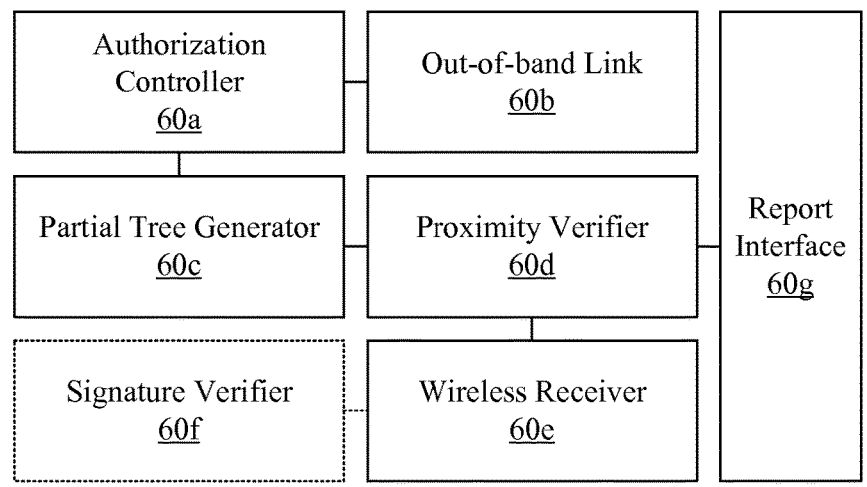
FIG. 4 is a block diagram of an example of an observation device according to an embodiment.

FIG. 4 shows an observation device 60 (60a-60g). The observation device 60 may generally implement one or more of the observation blocks of the method 30 (FIG. 2) for one or more different beacon signals. More particularly, the observation device 60 may include an authorization controller 60a that receives, via an out-of-band link 60b, a PRN associated with a particular time period. The authorization controller 60a may also receive an indication of the particular time period along with the PRN. A partial tree generator 60c (e.g., including one or more PRNGs) may be coupled to the authorization controller 60a, wherein the partial tree generator 60c is configured to use the PRN to generate a subset of a PRN tree that corresponds to the particular time period. Additionally, the observation device 60 may include a receiver 60e (e.g., wireless Bluetooth receiver) to detect a beacon signal and a proximity verifier 60d to conduct a proximity determination of whether the detected beacon signal corresponds to one or more time-dependent branches of the subset of the PRN tree. As already noted, one or more of the time-dependent branches may be associated with a particular year, day, hour, second, fraction of a second, and so forth.

In one example, the observation device 60 also includes a signature verifier 60f to use a public key associated with a beacon device to verify a digital signature as the beacon signal. Additionally, the proximity verifier 60d may use a report interface 60g (e.g., display, speaker, printer, mass storage, network controller, etc.), to report that a mobile source of the beacon signal traveled within proximity of the observation device 60 during the particular time period if the proximity determination indicates that the beacon signal corresponds to one or more time-dependent branches of the subset of the PRN tree. In another example, if the observation device 60 is a mobile observation device, the proximity verifier 60d may use the report interface 60g to report whether the mobile observation device traveled within proximity of a source of the beacon signal during the particular time period.

Additionally, portions of the beacon device 52 (FIG. 3) and/or the observation device 60 may be distributed across multiple platforms. For example, one could use a phone, for example, to generate PRNG trees and signatures, or to verify them, wherein a separate device might transmit and/or receive beacon signals and pass them on to another device for computation.

Figure 5:
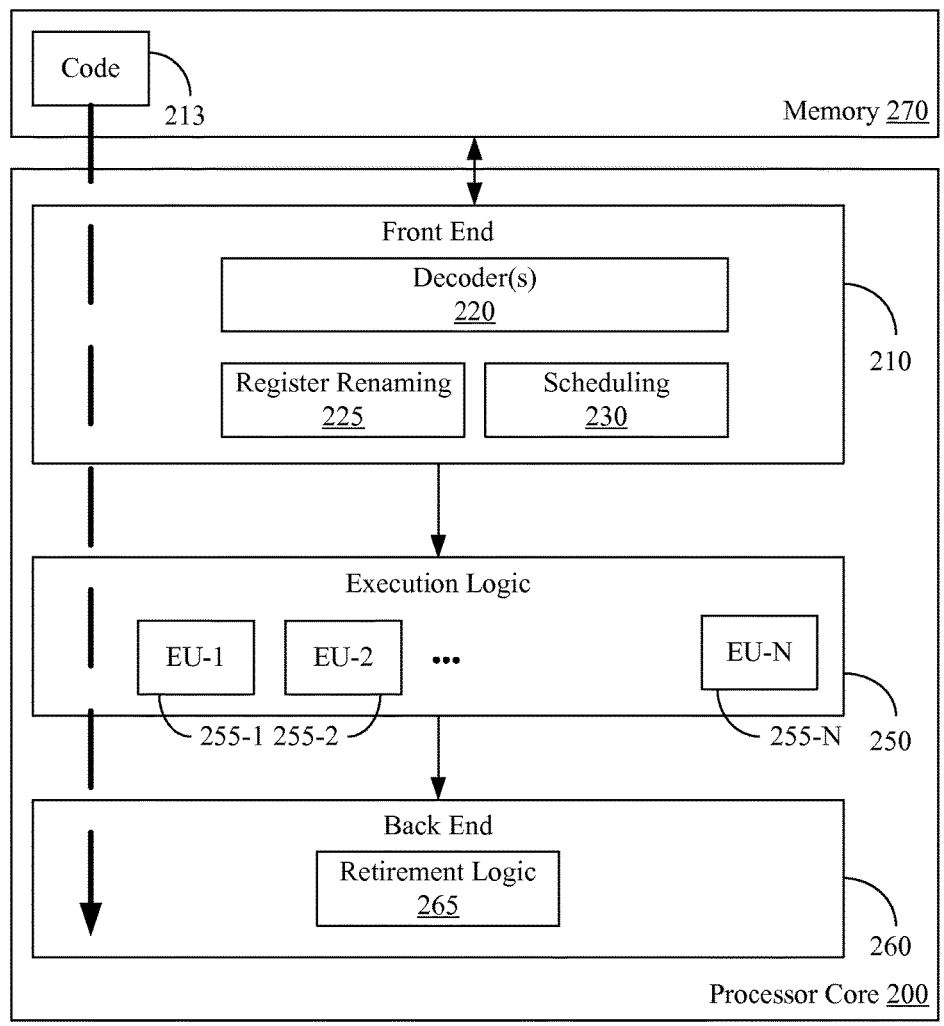
FIG. 5 is a block diagram of an example of a processor according to an embodiment.

FIG. 5 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 5, a processing element may alternatively include more than one of the processor core 200 illustrated in FIG. 5. The processor core 200 may be a single-threaded core or, for at least one embodiment, the processor core 200 may be multithreaded in that it may include more than one hardware thread context (or "logical processor") per core.

FIG. 5 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the beacon blocks or the observation blocks of the method 30 (FIG. 2), already discussed. In one example, the memory 270 is non-flash memory. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 5, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 6:
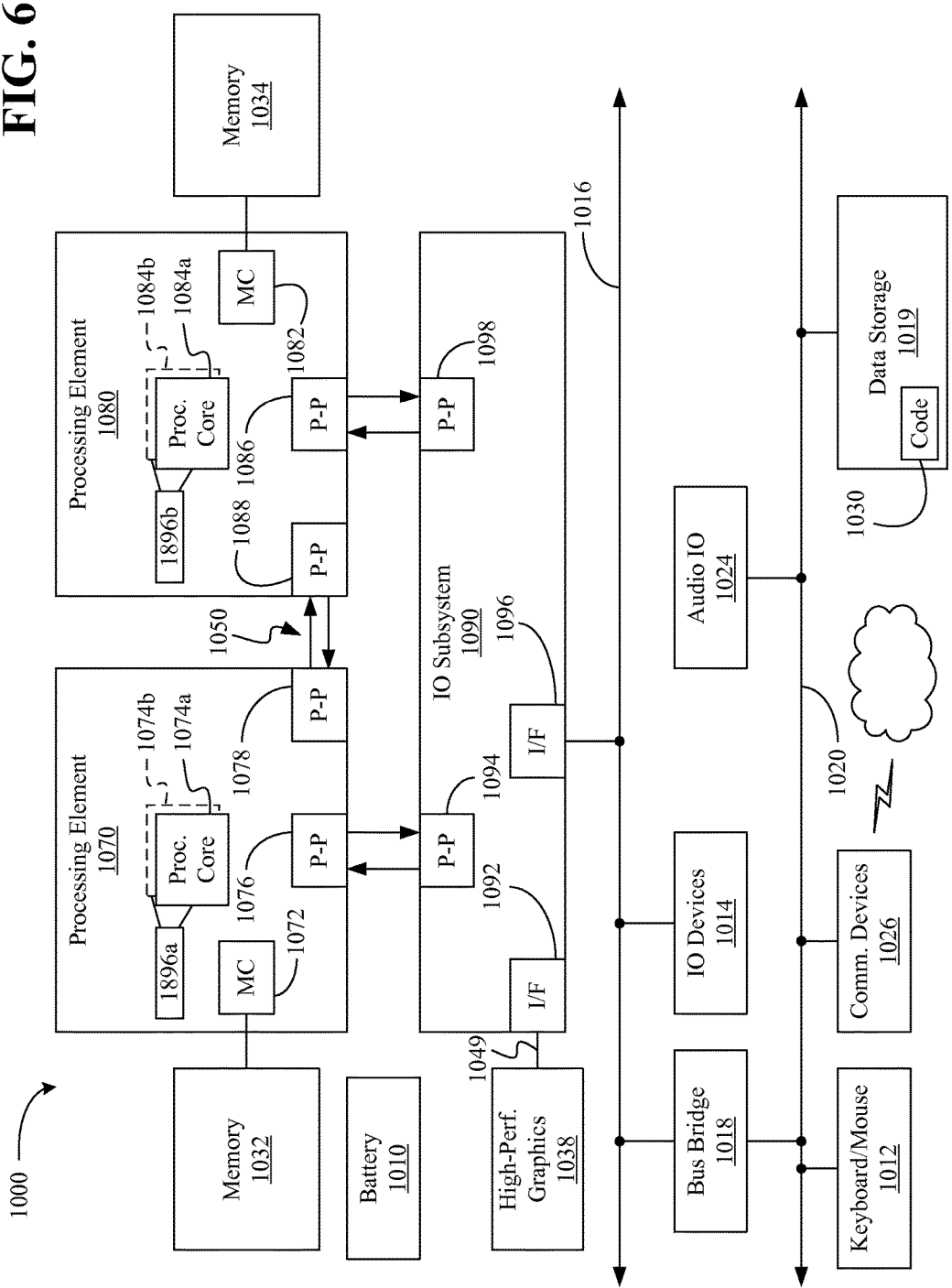
FIG. 6 is a block diagram of an example of a computing system according to an embodiment.

Referring now to FIG. 6, shown is a block diagram of a computing system 1000 embodiment in accordance with an embodiment. Shown in FIG. 6 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 6 may be implemented as a multi-drop bus rather than point-to-point interconnect.

As shown in FIG. 6, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 5.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 6, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 6, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the beacon blocks or the observation blocks of the method 30 (FIG. 2), already discussed, and may be similar to the code 213 (FIG. 5), already discussed. Further, an audio I/O 1024 may be coupled to second bus 1020 and a battery 1010 may supply power to the computing system 1000.

Note that other embodiments are contemplated. For example, instead of the point-to-point architecture of FIG. 6, a system may implement a multi-drop bus or another such communication topology. Also, the elements of FIG. 6 may alternatively be partitioned using more or fewer integrated chips than shown in FIG. 6.

Additional Notes and Examples

Example 1 may include a beacon device comprising a location to store a seed value, a seed retriever coupled to the location, the seed retriever to obtain the seed value from the location, a tree generator coupled to the seed retriever, the tree generator to use the seed value to initiate generation of a pseudo random number tree having time-dependent branches, and a transmitter coupled to the tree generator, the transmitter to send a beacon signal based on the pseudo random number tree and a timing scheduler that corresponds to the time-dependent branches.

Example 2 may include the beacon device of Example 1, wherein one or more of the time-dependent branches of the pseudo random number tree is to be associated with one of a particular year, a particular day, a particular hour, a particular minute, a particular second or a particular fraction of a second.

Example 3 may include the beacon device of Example 1, wherein the transmitter is to send one or more leaves of the pseudo random number tree.

Example 4 may include the beacon device of Example 1, wherein the beacon device further includes a security component to determine one or more signature values for one or more leaves of the pseudo random number tree based on a private key, and the transmitter is to send the one or more signature values.

Example 5 may include the beacon device of Example 4, wherein the location further includes the private key.

Example 6 may include the beacon device of any one of Examples 1 to 5, wherein the seed value is a true random number.

Example 7 may include at least one computer readable storage medium comprising a set of instructions which, when executed by a beacon device, cause the beacon device to obtain a seed value from a location on the beacon device, use the seed value to initiate generation of a pseudo random number tree having time-dependent branches, and send a beacon signal based on the pseudo random number tree and a timing schedule that corresponds to the time-dependent branches.

Example 8 may include the at least one computer readable storage medium of Example 7, wherein one or more of the time-dependent branches of the pseudo random number tree is to be associated with one of a particular year, a particular day, a particular hour, a particular minute, a particular second or a particular fraction of a second.

Example 9 may include the at least one computer readable storage medium of Example 7, wherein the instructions, when executed, cause the beacon device to send one or more leaves of the pseudo random number tree.

Example 10 may the at least one computer readable storage medium of Example 7, wherein the instructions, when executed, cause a beacon device to determine one or more signature values for one or more leaves of the pseudo random number tree based on a private key; and send the one or more signature values.

Example 11 may include the at least one computer readable storage medium of Example 10, wherein the instructions, when executed, cause the beacon device to obtain the private key from the location on the beacon device.

Example 12 may include the at least one computer readable storage medium of any one of Examples 7 to 11, wherein the seed value is to be a true random number.

Example 13 may include an observation device comprising an authorization controller to receive, via an out-of-band link, a pseudo random number associated with a particular time period, a partial tree generator coupled to the authorization controller, the partial tree generator to use the pseudo random number to generate a subset of a pseudo random number tree that corresponds to the particular time period, and a proximity verifier coupled to the tree generator, the proximity verifier to conduct a proximity determination of whether a detected beacon signal corresponds to one or more time-dependent branches of the subset of the pseudo random number tree.

Example 14 may include the observation device of Example 13, wherein one or more of the time-dependent branches is to be associated with one of a particular year, a particular day, a particular hour, a particular minute, a particular second or a particular fraction of a second.

Example 15 may include the observation device of Example 13, further including a signature verifier to use a public key associated with a beacon device to verify a digital signature as the beacon signal.

Example 16 may include the observation device of any one of Examples 13 to 15, wherein the proximity verifier is to report that a mobile source of the beacon signal traveled within proximity of the observation device during the particular time period if the proximity determination indicates that the beacon signal corresponds to one or more time-dependent branches of the subset of the pseudo random number tree.

Example 17 may include the observation device of any one of Examples 13 to 15, wherein the observation device is a mobile observation device, and wherein the proximity verifier is to report that the mobile observation device traveled within proximity of a source of the beacon signal during the particular time period if the proximity determination indicates that the beacon signal corresponds to one or more time-dependent branches of the subset of the pseudo random number tree.

Example 18 may include the observation device of any one of Examples 13 to 15, wherein an indication of the particular time period is to be received along with the pseudo random number.

Example 19 may include at least one computer readable storage medium comprising a set of instructions which, when executed by an observation device, cause the observation device to receive, via an out-of-band link, a pseudo random number associated with a particular time period, use the pseudo random number to generate a subset of a pseudo random number tree that corresponds to the particular time period, and conduct a proximity determination of whether a detected beacon signal corresponds to one or more time-dependent branches of the subset of the pseudo random number tree.

Example 20 may include be at least one computer readable storage medium of Example 19, wherein one or more of the time-dependent branches is to be associated with one of a particular year, a particular day, a particular hour, a particular minute, a particular second or a particular fraction of a second.

Example 21 may include the at least one computer readable storage medium of Example 19, wherein the instructions, when executed, cause the observation device to use a public key associated with a beacon device to verify a digital signature as the beacon signal.

Example 22 may include the at least one computer readable storage medium of any one of Examples 19 to 21, wherein the instructions, when executed, cause the observation device to report that a mobile source of the beacon signal traveled within proximity of the observation device during the particular time period if the proximity determination indicates that the beacon signal corresponds to one or more time-dependent branches of the subset of the pseudo random number tree.

Example 23 may include the at least one computer readable storage medium of any one of Examples 19 to 21, wherein the observation device is to be a mobile observation device, and wherein the instructions, when executed, cause the observation device to report that the mobile observation device traveled within proximity of a source of the beacon signal during the particular time period if the proximity determination indicates that the beacon signal corresponds to one or more time-dependent branches of the subset of the pseudo random number tree.

Example 24 may include the at least one computer readable storage medium of any one of Examples 19 to 21, wherein an indication of the particular time period is to be received along with the pseudo random number.

Example 25 may include a method of operating a beacon device, comprising obtaining a seed value from a location on the beacon device, using the seed value to initiate generation of a pseudo random number tree having time-dependent branches, and sending a beacon signal based on the pseudo random number tree and a timing schedule that corresponds to the time-dependent branches.

Example 26 may include the method of Example 25, wherein one or more of the time-dependent branches of the pseudo random number tree is associated with one of a particular year, a particular day, a particular hour, a particular minute, a particular second or a particular fraction of a second.

Example 27 may include the method of Example 25, wherein sending the beacon signal includes sending one or more leaves of the pseudo random number tree.

Example 28 may include the method of Example 25, wherein sending the beacon signal includes determining one or more signature values for one or more leaves of the pseudo random number tree based on a private key; and sending the one or more signature values.

Example 29 may include the method of Example 28, further including obtaining the private key from the location on the beacon device.

Example 30 may include the method of any one of Examples 25 to 29, wherein the seed value is a true random number.

Example 31 may include a method of operating an observation device, comprising receiving, via an out-of-band link, a pseudo random number associated with a particular time period, using the pseudo random number to generate a subset of a pseudo random number tree that corresponds to the particular time period, and conducting a proximity determination of whether a detected beacon signal corresponds to one or more time-dependent branches of the subset of the pseudo random number tree.

Example 32 may include the method of Example 31, wherein one or more of the time-dependent branches is associated with one of a particular year, a particular day, a particular hour, a particular minute, a particular second or a particular fraction of a second.

Example 33 may include the method of Example 31, further including using a public key associated with a beacon device to verify a digital signature as the beacon signal.

Example 34 may include the method of any one of Examples 31 to 33, further including reporting that a mobile source of the beacon signal traveled within proximity of the observation device during the particular time period if the proximity determination indicates that the beacon signal corresponds to one or more time-dependent branches of the subset of the pseudo random number tree.

Example 35 may include the method of any one of Examples 31 to 33, wherein the observation device is a mobile observation device, the method further including reporting that the mobile observation device traveled within proximity of a source of the beacon signal during the particular time period if the proximity determination indicates that the beacon signal corresponds to one or more time-dependent branches of the subset of the pseudo random number tree.

Example 36 may include the method of any one of Examples 31 to 33, wherein an indication of the particular time period is received along with the pseudo random number.

Example 37 may include a beacon device comprising means for performing the method of any of Examples 25 to 30.

Example 38 may include a beacon device comprising means for performing the method of any of Examples 31 to 35.

Thus, techniques described herein may provide a seemingly random and changing beacon signal for each individual beacon device, where the sequence of seemingly random values may be validated as belonging to a given group associated with a location and/or person. Because the beacon signal is dynamic, unpredictable and time-bounded, it may provide probabilistic evidence of a person being in a given place without advertising that fact to a service. In other words, the beacon device may emit a changing stream of seemingly random numbers that may be associated with a single value by someone authorized to do so. Moreover, the stream may not require a server to associate the values contained therein with the single value. To preserve privacy, access to beacon identity may be limited to a specific time frame and also does not require a server to convert the stream into an identity. Additionally, digitally signing the stream may enable verification of the identity of a beacon device without permitting the verifier to masquerade as that beacon device.

Indeed, techniques may provide after-the-fact proof that an anonymous person was at a specific place at a specific time. For example, a location specific infrastructure may benefit from being able to observe people carrying beacon devices nearby, without knowing their identity, yet being able to prove later that they were present. In one such example, a vending machine might offer incentives to those close enough to the machine to observe advertising displayed on the machine. Another example may be a system located in a coffee shop that rewards customers for frequent visits. Such a system might offer an occasional free drink to people who spend a considerable amount of time nearby. Of particular note is that using asymmetric cryptography as described herein may ensure that such systems are not "gamed" into giving away incentives in excess of incentives actually earned. By using signed time-bounded PRN trees, protection against such unauthorized activity may be obtained.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A beacon device comprising:
   a location to store a seed value;
   a seed retriever coupled to the location, the seed retriever to obtain the seed value from the location;
   a tree generator coupled to the seed retriever, the tree generator to use the seed value to initiate generation of a pseudo random number tree having time-dependent branches; and
   a transmitter coupled to the tree generator, the transmitter to send a beacon signal based on the pseudo random number tree and a timing schedule that corresponds to the time-dependent branches,
   wherein the beacon device further includes a security component to determine one or more signature values for one or more leaves of the pseudo random number tree based on a private key, and the transmitter is to send the one or more signature values.

2. The beacon device of claim 1, wherein one or more of the time-dependent branches of the pseudo random number tree is to be associated with one of a particular year, a particular day, a particular hour, a particular minute, a particular second or a particular fraction of a second.

3. The beacon device of claim 1, wherein the transmitter is to send one or more leaves of the pseudo random number tree.

4. The beacon device of claim 1, wherein the location further includes the private key.

5. The beacon device of claim 1, wherein the seed value is a true random number.

6. At least one non-transitory computer readable storage medium comprising a set of instructions which, when executed by a beacon device, cause the beacon device to:
   obtain a seed value from a location on the beacon device;
   use the seed value to initiate generation of a pseudo random number tree having time-dependent branches;
   send a beacon signal based on the pseudo random number tree and a timing schedule that corresponds to the time-dependent branches;
   determine one or more signature values for one or more leaves of the pseudo random number tree based on a private key; and
   send the one or more signature values.

7. The at least one non-transitory computer readable storage medium of claim 6, wherein one or more of the time-dependent branches of the pseudo random number tree is to be associated with one of a particular year, a particular day, a particular hour, a particular minute, a particular second or a particular fraction of a second.

8. The at least one non-transitory computer readable storage medium of claim 6, wherein the instructions, when executed, cause the beacon device to send one or more leaves of the pseudo random number tree.

9. The at least one non-transitory computer readable storage medium of claim 6, wherein the instructions, when executed, cause the beacon device to obtain the private key from the location on the beacon device.

10. The at least one non-transitory computer readable storage medium of claim 6, wherein the seed value is to be a true random number.

11. An observation device comprising:
    an authorization controller to receive, via an out-of-band link, a pseudo random number associated with a particular time period;
    a partial tree generator coupled to the authorization controller, the partial tree generator to use the pseudo random number to generate a subset of a pseudo random number tree that corresponds to the particular time period; and
    a proximity verifier coupled to the tree generator, the proximity verifier to conduct a proximity determination of whether a detected beacon signal corresponds to one or more time-dependent branches of the subset of the pseudo random number tree,
    wherein the proximity verifier is to report that a mobile source of the beacon signal traveled within proximity of the observation device during the particular time period if the proximity determination indicates that the beacon signal corresponds to one or more time-dependent branches of the subset of the pseudo random number tree.

12. The observation device of claim 11, wherein one or more of the time-dependent branches is to be associated with one of a particular year, a particular day, a particular hour, a particular minute, a particular second or a particular fraction of a second.

13. The observation device of claim 11, further including a signature verifier to use a public key associated with a beacon device to verify a digital signature as the beacon signal.

14. The observation device of claim 11, wherein the observation device is a mobile observation device, and wherein the proximity verifier is to report that the mobile observation device traveled within proximity of a source of the beacon signal during the particular time period if the proximity determination indicates that the beacon signal corresponds to one or more time-dependent branches of the subset of the pseudo random number tree.

15. The observation device of claim 11, wherein an indication of the particular time period is to be received along with the pseudo random number.

16. At least one non-transitory computer readable storage medium comprising a set of instructions which, when executed by an observation device, cause the observation device to:
- receive, via an out-of-band link, a pseudo random number associated with a particular time period;
- use the pseudo random number to generate a subset of a pseudo random number tree that corresponds to the particular time period; and
- conduct a proximity determination of whether a detected beacon signal corresponds to one or more time-dependent branches of the subset of the pseudo random number tree,
- wherein the instructions, when executed, cause the observation device to report that a mobile source of the beacon signal traveled within proximity of the observation device during the particular time period if the proximity determination indicates that the beacon signal corresponds to one or more time-dependent branches of the subset of the pseudo random number tree.

17. The at least one non-transitory computer readable storage medium of claim 16, wherein one or more of the time-dependent branches is to be associated with one of a particular year, a particular day, a particular hour, a particular minute, a particular second or a particular fraction of a second.

18. The at least one non-transitory computer readable storage medium of claim 16, wherein the instructions, when executed, cause the observation device to use a public key associated with a beacon device to verify a digital signature as the beacon signal.

19. The at least one non-transitory computer readable storage medium of claim 16, wherein the observation device is to be a mobile observation device, and wherein the instructions,
- when executed, cause the observation device to report that the mobile observation device traveled within proximity of a source of the beacon signal during the particular time period if the proximity determination indicates that the beacon signal corresponds to one or more time-dependent branches of the subset of the pseudo random number tree.

20. The at least one non-transitory computer readable storage medium of claim 16, wherein an indication of the particular time period is to be received along with the pseudo random number.

* * * * *